US010442879B2

(12) United States Patent
Kalfus et al.

(10) Patent No.: US 10,442,879 B2
(45) Date of Patent: Oct. 15, 2019

(54) PROPYLENE-BASED IMPACT COPOLYMERS

(71) Applicant: ExxonMobil Chemical Patents Inc., Baytown, TX (US)

(72) Inventors: Jan Kalfus, Spring, TX (US); Abdul M. Jangda, Humble, TX (US); Mosha H. Zhao, Houston, TX (US)

(73) Assignee: ExxonMobil Chemical Patents Inc., Baytown, TX (US)

( * ) Notice: Subject to any disclaimer, the term of this patent is extended or adjusted under 35 U.S.C. 154(b) by 82 days.

(21) Appl. No.: 15/562,517

(22) PCT Filed: Mar. 23, 2016

(86) PCT No.: PCT/US2016/023674
§ 371 (c)(1),
(2) Date: Sep. 28, 2017

(87) PCT Pub. No.: WO2016/175942
PCT Pub. Date: Nov. 3, 2016

(65) Prior Publication Data

US 2018/0094089 A1 Apr. 5, 2018

Related U.S. Application Data

(60) Provisional application No. 62/153,828, filed on Apr. 28, 2015.

(51) Int. Cl.
*C08F 210/06* (2006.01)
*C08L 23/12* (2006.01)
(Continued)

(52) U.S. Cl.
CPC .............. *C08F 210/06* (2013.01); *C08K 5/14* (2013.01); *C08L 23/12* (2013.01); *C08L 53/02* (2013.01);
(Continued)

(58) Field of Classification Search
CPC ........... C08F 210/06; C08L 23/12; C08K 5/14
See application file for complete search history.

(56) References Cited

U.S. PATENT DOCUMENTS

| | | |
|---|---|---|
| 5,047,485 A | 9/1991 | DeNicola, Jr. |
| 5,416,169 A | 5/1995 | Saito et al. |

(Continued)

FOREIGN PATENT DOCUMENTS

| | | |
|---|---|---|
| EP | 2000504 A | 12/2008 |
| EP | 2433982 A | 3/2012 |

(Continued)

OTHER PUBLICATIONS

Lagendijk, R. P. et al. "Peroxydicarbonate modification of polypropylene and extensional flow properties", Polymer, vol. 42, No. 25, pp. 10035-10043, 2001.

(Continued)

*Primary Examiner* — Catherine S Branch
(74) *Attorney, Agent, or Firm* — Kevin M. Faulkner

(57) ABSTRACT

An impact copolymer comprising a polypropylene comprising at least 50 mol % propylene, and having a molecular weight distribution ($Mw_{MALLS}$/Mn) greater than 10, a branching index (g') of less than 0.97, and a melt strength greater than 40 cN, and an elastomer. Also disclosed is a method of making an impact copolymer composition comprising melt-blending the components, sequentially or simultaneously a polypropylene resin comprising at least 50 mol % propylene, and having a molecular weight distribution (Mw/Mn) greater than 6, a branching index (g') of at least 0.97, and a melt strength greater than 10 cN determined using an extensional rheometer at 190° C.; and within the range from 0.01 to 3 wt % of at least one organic peroxide; and an elastomer.

19 Claims, 1 Drawing Sheet

(51) Int. Cl.
*C08K 5/14* (2006.01)
*C08L 53/02* (2006.01)

(52) U.S. Cl.
CPC ....... *C08F 2500/04* (2013.01); *C08F 2500/11* (2013.01); *C08F 2500/21* (2013.01); *C08F 2500/24* (2013.01)

(56) References Cited

U.S. PATENT DOCUMENTS

| | | | |
|---|---|---|---|
| 5,883,151 A | 3/1999 | Raetzsch et al. | |
| 6,323,289 B1 | 11/2001 | Hogt et al. | |
| 6,350,828 B1 | 2/2002 | Takaoka et al. | |
| 6,573,343 B1 | 6/2003 | Follestad | |
| 6,875,826 B1 | 4/2005 | Huovinen et al. | |
| 6,956,067 B2 | 10/2005 | Sasaki et al. | |
| 8,153,745 B2 | 4/2012 | Ernst et al. | |
| 9,068,030 B2 | 6/2015 | Song et al. | |
| 9,200,095 B2 | 12/2015 | Tran et al. | |
| 2002/0043643 A1 | 4/2002 | Korehisa et al. | |
| 2003/0157286 A1 | 8/2003 | Hesse et al. | |
| 2010/0063212 A1 | 3/2010 | Oysaed et al. | |
| 2012/0245302 A1 | 9/2012 | Nakajima et al. | |
| 2018/0244883 A1* | 8/2018 | Zhao ...................... | C08K 5/098 |

FOREIGN PATENT DOCUMENTS

| | | |
|---|---|---|
| EP | 2679630 A | 1/2014 |
| KR | 20040085637 A | 10/2004 |
| WO | 1994/005707 A | 3/1994 |
| WO | 1997/49759 A | 12/1997 |
| WO | 1999/27007 A | 6/1999 |
| WO | 03/082971 A | 10/2003 |
| WO | 2012/049690 A | 4/2012 |
| WO | 2014/070384 A | 5/2014 |
| WO | 2014/070386 A | 5/2014 |
| WO | 2016/126429 A | 8/2016 |

OTHER PUBLICATIONS

Wagner, M. H., et al. “The strain-hardening behavior of linear and long-chain-branched polyolefin melts in extensional flows”, Rheol Acta, vol. 39, pp. 97-109, 2000.

Spitael P., et al. “Strain hardening in polypropylenes and its role in extrusion foaming”,Polymer Engineering and Science, vol. 44, No. 11, pp. 2090-2100, 2004.

Ratzsch M., et al. “Radical reactions on polypropylene in the solid state”, Progress in Polymer Science, vol. 27, pp. 1195-1282, 2002.

Spisakova N., et al. “Partial crosslinking of the heterophasic ethylene-propylene copolymer in the solid phase”, Journal of Macromolecular Science, Part A, vol. 37, pp. 15-35, 2000.

Jayaraman K. et al. “Entangling additives enhance polypropylene foam quality”, Society of Plastics Engineers Plastics Research Online, 2011.

Pol. H. et al. “Microstructure and rheology of high-melt-strength poly-(propylene) impact copolymer”, Society of Plastics Engineers Plastics Research Online, pp. 1-3. 2014.

Chikhalikar, K., et al. “Long chain branched impact copolymer of polypropylene: Microstructure and rheology”, Polymer Engineering and Science, vol. 55, No. 7, pp. 1463-1474, 2015.

Yang, J., et al. “Brittle-ductile transition of PP/POE blends in both impact and high speed tensile tests”, Polymer, vol. 44, No. 17, pp. 5047-5052, 2003.

Lacobucci, P., “High Melt Strength Polypropylene Through Reactive Extrusion with Perkadox 24L”, SPE, Polyolefins Conference, Houston, TX Feb. 2014.

Gotsis, A.D., “Effect of long branches on the rheology of polypropylene” Journal of Rheology, vol. 48, No. 4, pp. 895-914, 2004.

* cited by examiner

PROPYLENE-BASED IMPACT COPOLYMERS

CROSS-REFERENCE TO RELATED APPLICATIONS

The present application is a National Phase Application claiming priority to PCT Application Serial No. PCT/US2016/023674 filed Mar. 23, 2016 and claims priority to U.S. Ser. No. 62/153,828 filed on Apr. 28, 2015 which are incorporated by reference.

FIELD OF THE INVENTION

The present disclosure relates to reactor blends of modified polypropylenes and elastomers to form impact copolymers.

BACKGROUND

Zeigler Natta ("ZN") impact copolymers ("ICPs") have enjoyed considerable success in the marketplace in spite of structural deficiencies inherent in their design due to the complex multi-sited nature of the ZN catalysts and the multi-step process itself. Two decades of research in this area suggests that post-reactor modification is one way to significantly differentiate the ZN-ICP from other reactor blends (in-situ) or physical melt-blends (ex-situ). Even further, ex-situ blends may replace common in-situ ICP's due to the inherent ability to tailor the polymers while in the melt. It is known for example that certain peroxides, especially organic peroxides, can be used to visbreak polypropylenes, and cross-link polyethylenes. The inventors here demonstrate that post-reactor modification of the polypropylene portion of a polypropylene-based ICP through treatment with short half-life organic peroxides can offer a significant performance improvement.

Relevant publications include EP 2 679 630 A1; EP 2 000 504 A1; U.S. Pat. Nos. 5,883,151; 6,875,826; 6,573,343; US 2003/0157286; WO 1997/49759; WO 1999/27007; WO 1994/005707; and WO 2014/070386; as well as:

- M. H. Wagner et al., "The strain-hardening behaviour of linear and long-chain-branched polyolefin melts in extensional flows," in 39 Rheol. Acta 97-109 (2000);
- N. Spisakova et al., in 15 J. Macrm. Sci. & App. Chem. 37 (2000);
- R. P. Lagendijk et al., in "Peroxydicarbonate modification of polypropylene and extensional flow properties," in 42 Polymer 10035-10043 (2001);
- M. Ratzsch et al., 27 Prog. Polym. Sci. 1195 (2002);
- P. Spitael et al., in "Strain hardening in polypropylenes and its role in extrusion foaming," in 44(11) Poly. Eng. & Sci. 2090-2100 (2004);
- P. Iacobucci, "High melt strength polypropylene through reactive extrusion with Perkadox 24L," SPE Polyolefins Conference, Houston, Tex. (February 2004);
- K. Jayaraman et al., "Entangling additives enhance polypropylene foam quality," in SPE Plastics Research Online (2011); and
- H. Pol et al., "Microstructure and rheology of high-melt-strength poly-(propylene) impact copolymer," in SPE Plastics Research Online (2014).

SUMMARY

Disclosed is an impact copolymer comprising a polypropylene comprising at least 50 mol % propylene, and having a molecular weight distribution ($Mw_{MALLS}$/Mn) greater than 10, a branching index (g') of less than 0.97, and a melt strength greater than 40 cN determined using an extensional rheometer at 190° C., and an elastomer.

Also disclosed is a method of making an impact copolymer composition comprising melt blending the components, sequentially or simultaneously a polypropylene resin comprising at least 50 mol % propylene, and having a molecular weight distribution (Mw/Mn) greater than 6, a branching index (g') of at least 0.97, and a melt strength greater than 10 cN determined using an extensional rheometer at 190° C.; and within the range from 0.01 to 3 wt % of at least one organic peroxide, by weight of the polypropylene and organic peroxide; and an elastomer, wherein the reaction product of the propylene resin and the organic peroxide is a polypropylene.

DETAILED DESCRIPTION

Figure 1:
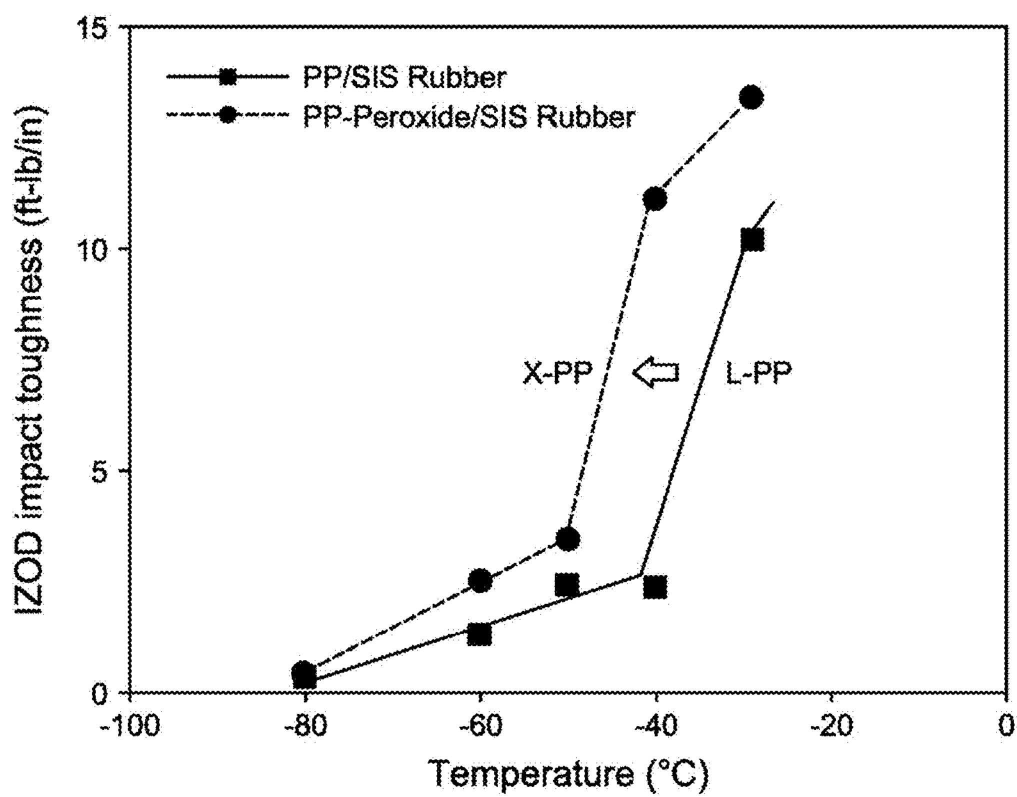
FIG. 1 is a plot of the Izod Impact of comparative and inventive ICPs as a function of the glass transition temperature.

The present disclosure includes an ICP and a method to make the ICP, or stated another way, a method to improve the low temperature impact behavior of the polypropylene matrix of an ICP during melt extrusion of the polypropylene ("PP") using commercially available organic peroxides to effect post-reactor light cross-linking. Under suitable conditions, PP cross-linking occurs with a much higher rate than beta-scission processes which leads to the formation of a PP composition comprising cross-linked polypropylene, a long-chain branched polypropylene, or a combination thereof thus having a "hyperbranched-type" structure, though the invention is not limited herein to any particular type of structure or polymer architecture, but is described by the GPC and other features outlined below. Such a polypropylene would have a low propensity to relax during injection molding, thus desirably resulting in the formation of highly oriented semicrystalline domains in the final material. Such domains would reduce the strain localization during the deformation process and, hence, allow more homogeneous distribution of stresses on the microscopic level. This in turn leads to an improved ability of the material to involve larger volumes in the deformation process and dissipate more energy. To demonstrate that such a concept has a utility even for melt-blends of PP with an elastomer, model blends of PP and styrene-isoprene-styrene ("SIS") rubber (an effective toughening rubber), prepared by compounding (mixing and melt-blending) on a twin-screw extruder, were tested. Results demonstrated that the Brittle-Ductile Transition temperature (the inflection point of the Izod Impact versus Temperature relationship) decreases to lower temperatures due to the peroxide treatment.

In particular, the inventors have found that a polypropylene having broad molecular weight distribution (Mw/Mn higher than 4, based on DRI measurement) and melt index as disclosed in WO 2014/070386, when melt extruded with certain organic peroxides will form hyperbranched architectures in addition to some beta-scissions. Desirable organic peroxides are fast decomposing peroxides that have a half-life time of less than one hour, or 30 minutes at 100° C. (or as described elsewhere herein). The half-life values described herein are determined titrimetrically using differential scanning calorimetry-thermal activity monitoring (DSC-TAM) of a dilute solution of the organic peroxide in mono-chlorobenzene.

Organic peroxide concentrations within the range from 0.1 to 3.0 wt %, by weight of the organic peroxide and polypropylene resin present, are typically used herein to provide sufficiently high steady state concentration of free radicals to form the hyperbranched polypropylenes. Such an approach preferably starts with a relatively low melt flow rate ("MFR", ASTM D1238, 230° C., 2.16 kg) polypropylene (e.g., lower than MFR of 20, or 40 g/10 min) as a starting material. It is believed that the high molecular weight fractions resulting from organic peroxide treatment are desirable to form long vinyl terminated PP fragments that can be incorporated into one another to form hierarchical hyperbranched structures.

The hyperbranched polypropylenes can be blended with a rubber component such as a styrene-isoprene-styrene block copolymer ("SIS") to form an ICP. As will be shown, such cross-linked-PP/rubber blends demonstrate superior impact performance. Such approach could be used to produce enhanced slurry-gas phase ICP blends through dry blending ICP reactor granules with suitable peroxide and consequent high throughput extrusion. Such an improved ICP grade could be used either as a standard starting material for further compounding or for foaming in thermoformed or injection molded articles to create light weight car interior parts.

Thus, described here in any embodiment is an ICP comprising the reaction product of a polypropylene resin comprising at least 50 mol % propylene, and having a molecular weight distribution (Mw/Mn) of greater than 6, a branching index (g') of at least 0.97, and a melt strength greater than 10 cN determined using an extensional rheometer at 190° C.; and within the range from 0.01, or 0.5 wt % to 2, or 2.5, or 3 wt % of at least one organic peroxide, by weight of the polypropylene resin and organic peroxide either alone then blended with an elastomer or blended simultaneously with an elastomer, wherein the reaction product of the polypropylene resin and the organic peroxide is the hyperbranched polypropylene. While the elastomer can be combined, preferably melt blended, with the polypropylene resin and organic peroxide simultaneously, most preferably the polypropylene resin and organic peroxide are first combined, followed by combining with the elastomer.

All Sheer Thinning and Strain Hardening measurements referred to herein were performed using a MCR501 Dynamic Stress/Strain Rheometer. A TA Instruments ARES-G2 mechanical spectrometer was used to measure strain hardening of the polypropylene samples. The samples were prepared in one of two ways:

Not Annealed Method: A sample was heated to around 200° C. for 3 min to melt the PP pellets without pressure. Then 1500 psi pressure was applied while the sample was kept heated for another 3 min between two plates. Afterwards, still under the 1500 psi pressure, the sample was cooled down with water circulation for 3 min.

Annealed Method: A sample was heated to around 200° C. for 3 min to melt the PP pellets without pressure. Then 1500 psi pressure was applied while the sample was kept heated for another 3 min between two plates. Afterwards, the pressure applied to sample was removed while the sample was kept heated at 200° C. for another 20 min. After 20 min, the sample was cooled down with water circulation without any pressure applied for additional 20 min.

Testing Temperature. The temperature can vary from 120° C. to 190° C. for extensional but was set 190° C. for PP testing. The Hencky strain rate was run at 0.01 $s^{-1}$, 0.1 $s^{-1}$ and 1.0 $s^{-1}$.

The melt strength and elongational viscosity were measured using a Rheotester 1000 capillary rheometer in combination with the Rheotens 71.97 (Göttfert) as described in established test method RHEO4-3.3 ("Measurement of the elongational viscosity of molten polymers"). The conditions for testing melt strength and extensional viscosity using the Rheotens 71-97 in combination with the Rheotester 1000 are described in RHEO4-3.3 are as follows:

Rheotester 1000:
Temperature: 190° C.
Die: 30/2
Piston speed: 0.278 mm/s
Shear rate: 40.050 $sec^{-1}$
Strand:
Length: 100 mm
Vo: 10 mm/s
Rheotens:
Gap: 0.7 mm
Wheels: grooved
Acceleration: 12.0 $mm/s^2$ For each polymer sample, several measurements are performed. The complete amount of material present in the barrel of the Rheotester was extruded through the die and was picked up by the rolls of the Rheotens. Once the strand was placed between the rolls, the roll speed was adjusted until a force of "zero" was measured. This beginning speed "Vs" was the speed of the strand through the nip of the wheels at the start of the test. Once the test was started, the speed of the rolls was increased with a 12.0 $mm/s^2$ acceleration and the force was measured for each given speed. After each strand break, or strand slip between the rotors, the measurement was stopped and the polymer sample was placed back between the rolls for a new measurement. A new curve was recorded. Measuring continued until all sample in the barrel was used. After testing, all the obtained curves were saved. Curves which were out of line were deactivated. The remaining curves were cut at the same point at break or slip (maximum force measured), and were used for the calculation of a mean curve. The numerical data of the calculated mean curves are reported.

As described herein, polymer molecular weight (weight-average molecular weight, Mw, number-average molecular weight, Mn, and z-averaged molecular weight, Mz) and molecular weight distribution (Mw/Mn) are determined using Size-Exclusion Chromatography. Equipment consists of a High Temperature Size Exclusion Chromatograph (either from Waters Corporation or Polymer Laboratories), with a differential refractive index detector (DRI), an online light scattering detector, and a viscometer (SEC-DRI-LS-VIS), or MALLS 3D detector. For purposes of the claims and description, unless otherwise specified, SEC-DRI shall be used, but for highly branched materials, multiple angle light scattering (MALLS) 3D detection, especially for measuring Mw and Mz. Three Polymer Laboratories PLgel 10 mm Mixed-B columns are used. The nominal flow rate is 0.5 $cm^3$/min and the nominal injection volume is 300 μL. The various transfer lines, columns and differential refractometer (the DRI detector) are contained in an oven maintained at 135° C. Solvent for the SEC experiment is prepared by dissolving 6 grams of butylated hydroxy toluene as an antioxidant in 4 liters of reagent grade 1,2,4-trichlorobenzene (TCB). The TCB mixture is then filtered through a 0.7 μm glass pre-filter and subsequently through a 0.1 μm Teflon filter. The TCB is then degassed with an online degasser before entering the SEC. The Mark-Houwink constants used were K=0.000229, and a=0.705. Details of this method are elaborated upon in columns 35-36 of U.S. Pat. No. 7,807,769.

Also described herein is an ICP comprising a hyperbranched polypropylene comprising at least 50 mol % propylene, and having a molecular weight distribution ($Mw_{MALLS}$/Mn) greater than 10, a branching index (g') of less than 0.97, and a melt strength greater than 40 cN determined using an extensional rheometer at 190° C.; and an elastomer. The reaction product of the propylene resin and the organic peroxide is the hyperbranched polypropylene.

In any case, the hyperbranched polypropylene is preferably the "continuous" phase of the ICP, and the elastomer forms discontinuous "domains", preferably of average diameter of less than 1000 nm. In particular, in any embodiment the elastomer forms oriented lamella having a length within the range from 100, or 200, or 300 nm to 800 or 1000 nm.

The various features of the invention are further described herein.

Polypropylene Resin

The inventive ICPs are made from hyperbranched-type polypropylenes derived from a polypropylene having a relatively high Melt Strength (greater than 10, or 20 cN), referred herein simply as a "polypropylene resin" having certain desirable features. Some desirable features and method of production are described in WO 2014/070386. In particular, in any embodiment the polypropylene resin useful herein comprises at least 50, or 60, or 70, or 80, or 90 mol % propylene, or within a range from 50, or 60, or 80 to 95, or 99 mol % propylene-derived units, the remainder of the monomer units selected from the group consisting of ethylene and $C_4$ to $C_{20}$ olefins, preferably ethylene or 1-butene. In any embodiment the polypropylene resin may be a homopolymer of propylene-derived units.

In any embodiment the polypropylene resin has an isopentad percentage of greater than 90, or 92, or 95%. Also in any embodiment the polypropylene resin has a melt flow rate (MFR) within the range from 0.1, or 1, or 2 g/10 min to 12, or 16, or 20, or 40 g/10 min, determined according to ASTM D1238 Condition L (230° C./2.16 kg).

In any embodiment the polypropylene resin has a molecular weight distribution (Mw/Mn) greater than 6, or 7, or 8; or within a range from 6, or 7, or 8 to 14, or 16, or 18 or 20. Also in any embodiment the polypropylene resin has an Mz/Mw value of less than or equal to 3.6, or 3.4, or 3.2, or 3.0. The polypropylene resins useful herein tend to be highly linear as evidenced by a high branching index. Thus, in any embodiment the polypropylene resins have a branching index (g', also referred to in the literature as $g'_{vis\ avg}$) of at least 0.97, or 0.98, as determined in column 37 of U.S. Pat. No. 7,807,769 determined by using a High Temperature Size Exclusion Chromatograph (either from Waters Corporation or Polymer Laboratories), equipped with three in-line detectors, a differential refractive index detector (DRI), a light scattering (LS) detector, and a viscometer. In any embodiment the polypropylene resins useful herein have a melt strength greater than 10, or 18, or 20 cN determined using an extensional rheometer at 190° C.; or within a range from 10, or 18, or 20 cN to 35, or 40 cN.

In any embodiment the polypropylene resins have a viscosity ratio within the range from 35 to 80 determined from the complex viscosity ratio at 0.01 to 100 rad/s angular frequency at a fixed strain of 10% at 190° C. Also in any embodiment the polypropylene resin has a Peak Extensional Viscosity (annealed) within a range from 10, or 20 kPa·s to 40, or 50, or 55, or 60 kPa·s at a strain rate of 0.01/sec (190° C.).

In any embodiment the polypropylene resin has a heat distortion temperature of greater than or equal to 100° C., determined according to ASTM D648 using a load of 0.45 MPa (66 psi). Finally, in any embodiment the polypropylene resin has a Modulus within the range from 1800, or 2000 MPa to 2400, or 2500 MPa determined according to ASTM D790A on nucleated samples with 0.1% α-nucleating agent.

The polypropylene resin can be used in any embodiment, such as by combining with other ingredients, in the form of reactor granules and/or flakes, or as extruder-formed pellets. It may also include additives as are known in the art such as antioxidants, clarifiers, UV stabilizers, blocking additives, inorganic fillers such as calcium carbonate, colorants such as dyes and titanium dioxide, and nucleators. In a preferred embodiment, commercial nucleators such as sodium benzoate are absent from the polypropylene resins used herein.

Organic Peroxides and Methods of Making Polypropylenes

The hyperbranched polypropylene, as stated above, is formed by combining under suitable conditions the polypropylene resin and an organic peroxide, wherein the "organic peroxide" is any organic compound comprising at least one —(O)COO— group and/or —O—O— group, and a 1 hour half-life temperature ($^1T_{1/2}$) of less than 100° C. determined in an aromatic and/or halogenated aromatic hydrocarbon solvent, preferably a ($^1T_{1/2}$) within the range from 25, or 35, or 45° C. to 65, or 75, or 85, or 100° C.

In any case, it is also preferable if the peroxide melts before it reacts with the polypropylene resin so that the granules get evenly coated and the high specific surface area is utilized prior to the branching and/or cross-linking reactions. In any embodiment, reactor granules of the polypropylene resin used herein are preferred over extruded pellets. Such polypropylene resin granules are preferably dry blended with the organic peroxide before "combining" as by, for example, melt blending in a single or twin screw extruder ("melt extrusion").

In any embodiment, the organic peroxide is selected from compounds having one or more structures selected from:

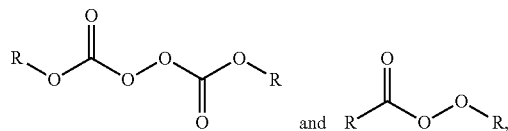

wherein each "R" group is independently selected from the group consisting of hydrogen, C1 or C5 to C24 or C30 linear alkyls, C1 or C5 to C24 or C30 secondary alkyls, C1 or C5 to C24 or C30 tertiary alkyls, C7 to C34 alkylaryls, C7 to C34 arylalkyls, and substituted versions thereof. By "substituted" what is meant are hydrocarbon "R" groups having substituents such as halogens, carboxylates, hydroxyl groups, amines, mercaptans, and phosphorous containing groups. In a particular embodiment, each "R" group is independently selected from C8 to C20 or C24 linear, secondary, or tertiary alkyls, such as octyl, decyl, lauryl, myristyl, cetyl, arachidyl, behenyl, erucyl and ceryl groups and linear, secondary or tertiary versions thereof.

The formation of the hyperbranched polypropylenes described herein are effected in any embodiment by melt blending, especially through shear forces and applied radiative heating during blending/extrusion, to a melt temperature of at least the melting point of the polypropylene resin, such as at least 140, or 150, or 160° C., or within a range from 140, or 150, or 160° C. to 180, or 200, or 220, or 240, or 260, or 280, or 300° C. Suitable means include a single or twin screw extruder or Brabender-type apparatus. In any embodiment the hyperbranched polypropylenes, directly from the extrusion process, are formed into reactor flakes and/or granules, or extruded pellets without being treated under vacuum and/or solvent washing.

In any embodiment, the product of the reaction between the organic peroxide and polypropylene resin may include decomposition products consisting of carbon dioxide and alcohol, preferably C8 to C24 alcohols, and most preferably an alcohol that is the hydroxylated equivalent of the organic peroxide use in the reaction. The alcohol is typically present, if at all, at a level of less than 2, or 1, or 0.5 wt % by weight of the hyperbranched polypropylenes. Described in this way, the hyperbranched polypropylene may have any of the properties described herein for the composition.

Thus formed, the hyperbranched polypropylenes described herein are ready to ship, transport, and/or store without further treatment, and be used in blending with an elastomer to make any number of articles, both foamed and non-foamed. In any embodiment a foaming agent may be added during the heating/extrusion process described above such that the agent is not activated until after shipping and ready to form into a foamed article. As mentioned, the composition may be later heated/extruded again to form articles and effect foaming, if so desired.

Hyperbranched Polypropylene

Thus in any embodiment the disclosure includes an ICP comprising the hyperbranched polypropylene. In any case, the polypropylene component of the ICP comprises within the range from 99.5, or 99.0, or 95, or 90 wt % to 80, or 70, or 60, or 50 wt %, by weight of the ICP, of the inventive ICPs described herein. In certain embodiments, the ICP consists essentially of one or more such polypropylenes as the continuous phase component, and consist essentially of one such polypropylene as the continuous phase component in a most preferred embodiment.

The hyperbranched polypropylene will have the same level of propylene and comonomer derived units as its precursor polypropylene resin. The polypropylene useful in the inventive ICP's can be characterized by any number of parameters as distinct from its polypropylene resin precursor. In any embodiment, the polypropylene has a Melt Strength within the range from 40, or 45 cN to 60, or 65, or 80, or 100 cN, and a branching index (g'vis) of less than 0.97, or 0.95.

In any embodiment the polypropylenes have a number average molecular weight (Mn), by DRI analysis, within a range from 18,000, or 20,000, or 24,000, or 28,000 g/mole to 40,000, or 44,000, or 48,000, or 50,000 g/mole. Also in any embodiment the polypropylenes have a weight average molecular weight (Mw), by MALLS analysis within the range from 250,000, or 300,000 or 350,000 g/mole to 450,000, or 500,000, or 550,000 or 600,000 g/mole. Also in any embodiment the polypropylenes have a z-average molecular weight (Mz), by MALLS analysis within the range from 1,000,000, or 1,100,000, or 1,200,000 g/mole to 1,500,000, or 1,600,000, or 1,700,000, or 1,800,000 g/mole. As an indicator of its high molecular weight component or "tail", the polypropylenes has in any embodiment an $Mz_{MALLS}/Mw_{MALLS}$ value of greater than 3.0, or 3.2, or 3.6, or within a range from 3.0, or 3.2, or 3.6 to 4.0 or 4.5 or 5.0 or 6.0. Also, the polypropylenes as a $Mz_{MALLS}/Mn$ of greater than 30 or 35 or 40, or within a range from 30, or 35, or 40 to 44, or 48, or 50, or 55, or 60. Also, the polypropylene as in any embodiment a $Mw_{MALLS}/Mn$ of greater than 10, or 12, or within a range from 10 or 12 to 18 or 20.

The polypropylenes have improved strain hardening (relative to the polypropylene resin) as evidenced in the increased Peak Extensional Viscosity. In any embodiment the polypropylenes have a Peak Extensional Viscosity (non-annealed) of greater than 50, or 55, or 60 kPa·s, or within a range from 50, or 55, or 60 kPa·s to 500, or 550, or 600 kPa·s at a strain rate of 0.01/sec (190° C.). In any embodiment the polypropylenes have a Peak Extensional Viscosity (annealed) of greater than 500, or 550, or 600 kPa·s, or within a range from 500, or 550, or 600 kPa·s to 2,000, or 2,500, or 3,000 kPa·s at a strain rate of 0.01/sec (190° C.). These and other parameters are described in detail in PCT/US2016/014237 filed Jan. 21, 2016.

Elastomer

The discontinuous domains within the polypropylene matrix of ICPs herein comprises (or consists of) at least one elastomer. As used herein, an "elastomer" are those polymers or polymeric compositions that, upon application of a stretching force, are stretchable in at least one direction (e.g., the CD, MD or therebetween), and which upon release of the stretching force, contracts/returns to approximately its original dimension. For example, a stretched material may have a stretched length that is at least 50% or 80% greater than its relaxed unstretched length, and which will recover to within at least 50% of its stretched length upon release of the stretching force. In any case, the elastomer component, which can be one or a combination of two or more different "elastomers" comprises within the range from 0.5, or 1.0, or 5.0, or 10 wt % to 20, or 30, or 40, or 50 wt %, by weight of the ICP, of the inventive ICPs described herein. In certain embodiments, the ICP consists essentially of one or more elastomers, and consist essentially of one elastomer in a most preferred embodiment.

The elastomer used to form the ICP can comprise any suitable elastomer capable of being melt blended. In any embodiment, the elastomer is selected from the group consisting of propylene-α-olefin elastomers, ethylene-α-olefin random and block copolymers (e.g., Infuse™ elastomers), natural rubber ("NR"), synthetic polyisoprene ("IR"), butyl rubber (copolymer of isobutylene and isoprene, "IIR"), halogenated butyl rubbers (chloro-butyl rubber: "CIIR"; bromo-butyl rubber: "BIIR"), polybutadiene ("BR"); styrenic copolymers and terpolymers such as styrene-butadiene rubber ("SBR" or "SBS"), styrene-isoprene-styrene ("SIS"), styrene-ethylene-propylene-styrene ("SEPS"), styrene-isobutylene-styrene, etc.; nitrile rubber, hydrogenated nitrile rubbers, chloroprene rubber ("CR"), polychloroprene, neoprene, ethylene-propylene rubber ("EPM"), ethylene-propylene-diene rubber ("EPDM"), epichlorohydrin rubber ("ECO"), polyacrylic rubber (e.g., "ACM", "ABR"), silicone rubber, fluorosilicone rubber, fluoroelastomers, perfluoroelastomers, polyether block amides ("PEBA"), chlorosulfonated polyethylene ("CSM"), ethylene-vinyl acetate ("EVA"), and polysulfide rubber; and blends referred to as thermoplastic elastomers ("TPE"), thermoplastic vulcanizates ("TPV"), thermoplastic polyurethane ("TPU"), thermoplastic polyolefins ("TPO") (random and block), or blends of any two or more of these specialty elastomer blends. These materials, individually or blended, can be at any molecular weight that will facilitate formation of a suitable ICP.

Styrenic Block Copolymers ("SBCs") are the largest-volume category of thermoplastic elastomers and are preferred here. Being thermoplastic elastomers, SBCs possess the mechanical properties of rubbers, and the processing characteristics of thermoplastic. This is related to their molecular structure. SBCs consist of at least three blocks, namely two hard polystyrene end blocks and one soft, elastomeric (polybutadiene, polyisoprene, hydrogenated or not) midblock. It is essential that the hard and soft blocks are immiscible, so that, on a microscopic scale, the polystyrene blocks form separate domains in the rubber matrix, thereby providing physical cross links to the rubber. Upon raising the temperature above the Tg (±100° C.) of polystyrene or on bringing the material into a hydrocarbon solvent, the polystyrene domains disintegrate and the SBCs become processable as a thermoplastic. When solidified, SBCs exhibit good elastomeric qualities. Tensile strength is higher than for unreinforced vulcanized rubbers. Elongation at Break ranges from 500% to 1200% and resilience is comparable to that of vulcanized rubbers. Melt viscosity is comparable to that of thermoplastics, such as polystyrene and polypropylene.

Thus, described more broadly in any embodiment the elastomer is an olefin block-containing copolymer. As used herein, the "olefin block-containing copolymer" is a copolymer or terpolymer (hereinafter "copolymer") that contains olefin blocks and at least one other polymerizable monomer-derived unit such as styrene, acrylate, etc., where the "olefin block" is one or two or more α-olefin derived units such as ethylene and propylene derived groups, wherein each group occurs in long sequences. Desirable olefin block-containing copolymers include styrene-butadiene-styrene (SBS), styrene-butadiene/butylene-styrene (SBBS), styrene-isoprene-styrene (SIS), styrene-ethylene/propylene-styrene (SEPS), styrene-ethylene/propylene (SEP), styrene-ethylene/butylene-styrene (SEBS), styrene-ethylene/ethylene/propylene-styrene (SEEPS), and styrene-isobutylene-styrene (SIBS), and hydrogenated versions thereof (of the unsaturated non-styrenic block portions). Preferably, the olefin block-containing copolymer is selected from the group consisting of styrene-butadiene-styrene block copolymers, styrene-isoprene-styrene block copolymers, more preferably hydrogenated versions of these polymers such as styrene-ethylene/propylene-styrene block polymers and styrene-ethylene/butene-styrene block polymers, and mixtures thereof. Even more preferably, the olefin block-containing copolymer is a hydrogenated styrene-olefin block-styrene copolymer having within the range of from 5 wt % to 25 wt % styrene-derived units by weight of the copolymer. The olefin block containing copolymers could be tri-blocks or di-blocks or a combination of both.

Also, in any embodiment the elastomer may be an ethylene-propylene copolymer, or "EPR" as is known in the art. Such copolymers may comprise within the range from 10, or 15, or 20, or 25 wt % to 35, or 45, or 55 or 65 wt % ethylene-derived units and have a melt index (190° C., 2.16 kg) within the range 0.1 or 0.5 g/10 min to 5, or 10, or 20 g/10 min. Such desirable ethylene-propylene copolymers can be made by any method, and most preferably either in a solution phase polymerization or gas phase polymerization. When using a titanium/magnesium based Ziegler-Natta catalyst, the molecular weight distribution (Mw/Mn, based on DRI) is within a range from 3.0, or 3.5 to 4.0, or 4.5, or 5.0, or 5.5, or 6.0; when using a single-site catalyst such as a metallocene or a pyridyldiamide Group 4 catalyst, the Mw/Mn (based on DRI) of the ethylene-propylene copolymer is within a range from 2.0, or 2.5 to 3.5, or 4.5, or 5.5.

The inventive ICPs may include other polymeric materials and/or common additives. Desirable polymeric materials include other polypropylene homopolymers (as defined above), polyethylenes, plastomers (high-comonomer ethylene polymers), propylene-based elastomers, ethylene-based plastomers, elastomers such as other EP rubbers, ethylene-propylene-diene ("EPDM"), butyl rubber, styrenic copolymers and block copolymers, and other impact copolymers. Common "additives" include fillers such as talc, carbon black, clay, silica, fatty acids, and other well-known materials, as well as antioxidants, anti-slip agents, pigments, cavitating agents (e.g., calcium carbonate), nucleating agents, curatives for added polymers that are curable, and any other of one or more well-known additives. These polymeric materials and additives may be compounded with the inventive ICP by traditional melt-blending such as in a Brabender mixer, or extruded in a single or double screw extruder, and can possibly be formed in to a thermoplastic vulcanizate as is well known in the art.

The inventive ICP has improved properties as demonstrated in a lowered Ductile-Brittle Transition temperature within the range from −60, or −55° C. to −45, or −40, or −35, or −30° C. The improved impact performance makes these ICPs highly suitable for any number of end uses. In particular, automotive components or appliance components can be made using the inventive ICPs.

The various descriptive elements and numerical ranges disclosed herein for the inventive ICPs and methods of forming such can be combined with other descriptive elements and numerical ranges to describe the invention(s); further, for a given element, any upper numerical limit can be combined with any lower numerical limit described herein, including the examples in jurisdictions that allow such ranges. The features of the inventions are demonstrated in the following non-limiting examples.

Examples

Comparative ICP:

The comparative ICP was a melt blend of a styrene-isoprene-styrene block copolymer and a linear polypropylene resin ("L-PP"). In particular, the L-PP was a Ziegler-Natta produced homopolymer having a melt flow rate ("MFR", 2.16 kg, 230° C.) of 4 g/10 min, an $I_2$ of 3.1 g/10 min (ASTM D1238 at 2.16 kg, 190° C.), an $I_{21}$ of 352 g/10 min (2.16 kg, 190° C.), an Mw/Mn (MWD, by DRI) of 8.4, a Mz/Mw (by DRI) of 2.9, and a Melt Strength of 22.2 cN. The polypropylene resin also had an Mn value of 41,300 g/mol, an Mw value of 347,400 g/mole, and an Mz value of 1,100,000 g/mole, all measured by DRI. The elastomer used to form the comparative and inventive ICP was Septon™ 2004 (hydrogenated styrene-isoprene-styrene, "SIS"). The components were dry blended, followed by being melt extruded so that the SIS elastomer was present in the ICP at 30 wt %.

In the current comparative and inventive examples, the following additives were also present in the ICP, added during dry blending: 2000 ppm of Irganox™ 1010, 2000 ppm of Irgafos™ 168, and 500 ppm of calcium stearate.

Melt blending was achieved by melt extrusion for both comparative and inventive examples using a twin screw extruder Thermo Prism (11 mm screw diameter), and extrusions were carried out under nitrogen atmosphere at a temperature of 200° C. (die: 200° C., zone 7: 200° C., zone 6: 200° C., zone 5: 195° C., zone 4: 190° C., zone 3: 185° C., zone 2: 180° C., zone 1: 175° C.) and rpm of 100.

Inventive ICP:

The inventive ICP was a melt blend of a styrene-isoprene-styrene block copolymer, same as in the comparative example, and a hyperbranched polypropylene. The hyperbranched polypropylene used for the inventive ICP was made using the polypropylene resin described for the comparative example that had been further treated with an organic peroxide. The organic peroxide used in the inventive example was 1 wt % Perkadox 24L™ (dicetyl peroxydicarbonate, from Akzo-Nobel, having a half-life of 1 hour at 65° C.) relative to the polypropylene and Perkadox blend. The organic peroxide and polypropylene resin were melt extruded to form the hyperbranched polypropylene. Once formed, the hyperbranched polypropylene was dry blended with the other additives and the Septon SIS as described above at room temperature. After dry blending, the blend was melt extruded so that the SIS elastomer was present in the ICP at 30 wt %.

Injection Molding and Testing.

Compounded ICPs prepared above were pelletized and used for making mini specimens for measuring Izod Impact Toughness (energy absorbed during impact). Injection was done under standard protocol at melt temperature 230° C., screw set at 50 rpm, injecting velocity 225 mm/s and injecting pressure 1800 psi. Izod Impact testing was done according to ASTM D256 at room temperature using equipment made by CEAST with 25 J pendulum at a velocity 3.46 m/s at a temperature of −80° C., −60° C., −50° C., −40° C., and −30° C.

Transmission Electron Microscopy (TEM).

Figure 2:
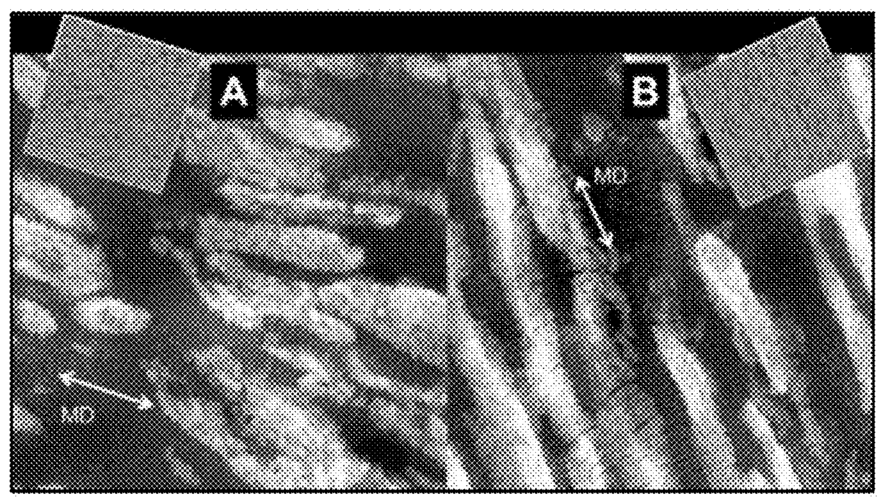
FIG. 2 is a Transmission Electron Micrograph (TEM) showing the microstructure of (A) comparative ICP and (B) (inventive) ICP; (B) shows oriented lamellae between SIS inclusions (the entire picture is 1×1 micron, where the double arrow shows MD (machine direction)).

Cryo-faced specimens (injection molded bar) of the ICPs were stained with ruthenium tetroxide for 4 hours and then cryo-microtomed thin cuts were made and deposited on copper meshes. TEM observations were done using FEI Tecnai G2 F-20 FE-TEM/STEM. As shown in FIG. 2, the peroxide treatment caused formation of hyperbranched domains in the polypropylene matrix that became oriented during the injection molding process due to their long relaxation time. These domains reinforce the inventive ICP and allow the matrix to involve larger volumes in the deformation process. Rubber domains between 100 and 1000 nanometers are demonstrated.

Impact Experimental Results.

FIG. 1 shows dependence of Izod Impact toughness on temperature for SIS rubber (Septon™ 2004) blends (melt extrusion) with the polypropylene resin ("L-PP", comparative) or polypropylene ("X-PP", inventive). The inflection point of these graphs is the Brittle-Ductile Transition temperature, and for improved impact resistance, it is desirable that this shift "left", or to lower temperatures on the chart in FIG. 1. The effect of peroxide treatment is very significant leading to a decrease of Brittle-Ductile Transition temperature to about −50° C. from approximately −38° C. when the polypropylene resin, not treated with the organic peroxide, is blended with the same elastomer to form an ICP.

Having described the various features of the inventive impact copolymers, described here in numbered paragraphs is:

P1. An impact copolymer comprising a polypropylene comprising at least 50 mol % propylene, and having a molecular weight distribution ($Mw_{MALLS}$/Mn) greater than 10, a branching index (g') of less than 0.97, and a melt strength greater than 40 cN determined using an extensional rheometer at 190° C., and an elastomer.

P2. The impact copolymer of numbered paragraph 1, wherein the polypropylene has an $Mz_{MALLS}/Mw_{MALLS}$ value of greater than 3.0.

P3. The impact copolymer of numbered paragraphs 1 or 2, wherein the polypropylene has an $Mw_{MALLS}$/Mn within the range from 10 to 20.

P4. The impact copolymer of any one of the previous numbered paragraphs, wherein the polypropylene is the reaction product of an organic peroxide and polypropylene resin; preferably the components are melt blended, such as by melt extrusion through a single or twin screw extruder.

P5. The impact copolymer of any one of the previous numbered paragraphs, wherein the polypropylene has a Melt Strength within the range from 40 cN to 100 cN.

P6. The impact copolymer of any one of the previous numbered paragraphs, wherein the ICP has a Brittle-Ductile Transition temperature within a range from −60° C. to −30° C.

P7. The impact copolymer of any one of the previous numbered paragraphs, wherein the elastomer forms oriented lamella domains in the polypropylene matrix having an average length (measured by TEM) of less than 1000 nm.

P8. The impact copolymer of any one of the previous numbered paragraphs, comprising decomposition products consisting of carbon dioxide and alcohol.

P9. Automotive components or appliance components comprising the impact copolymer of any one of the previous numbered paragraphs.

P10. A method of making an impact copolymer composition comprising melt-blending the components, sequentially or simultaneously:

a polypropylene resin comprising at least 50 mol % propylene, and having a molecular weight distribution (Mw/Mn) greater than 6, a branching index (g') of at least 0.97, and a melt strength greater than 10 cN determined using an extensional rheometer at 190° C.; and within the range from 0.01 to 3 wt % of at least one organic peroxide, by weight of the polypropylene resin and organic peroxide; and an elastomer wherein the reaction product of the propylene resin and the organic peroxide is a polypropylene.

P11. The method of numbered paragraph 10, wherein the elastomer is melt blended with the polypropylene resin and organic peroxide.

P12. The method of any one of numbered paragraphs 10 or 11, wherein the polypropylene resin and organic peroxide are first melt blended, followed by combining with the elastomer.

P13. The method of any one of numbered paragraphs 10 to 12, wherein the polypropylene resin has an MWD (Mw/Mn) within the range from 6 to 18.

P14. The method of any one of numbered paragraphs 10 to 13, wherein the polypropylene resin has a Melt Strength within the range from 20 cN to 40 cN.

P15. The method of any one of numbered paragraphs 10 to 14, wherein the polypropylene resin has a Peak Extensional Viscosity (annealed) within a range from 15 kPa·s to 60 kPa·s at a strain rate of 0.01 $sec^{-1}$ (190° C.).

P16. The method of any one of numbered paragraphs 10 to 15, wherein the polypropylene resin comprises at least 90 mol % propylene.

P17. The method of any one of numbered paragraphs 10 to 16, wherein the polypropylene resin has an Mz/Mw value of less than 3.6.

P18. The method of any one of numbered paragraphs 10 to 17, wherein the organic peroxide is selected from compounds having one or more structures selected from:

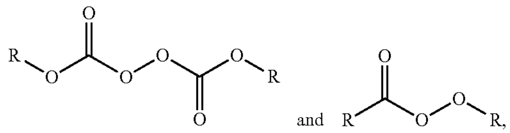

wherein each "R" group is independently selected from the group consisting of hydrogen, C1 to C24 linear alkyls, C1 to C24 secondary alkyls, C1 to C24 tertiary alkyls, C7 to C30 alkylaryls, C7 to C30 arylalkyls, and substituted versions thereof.

P19. The method of numbered paragraph 18, wherein each "R" group is independently selected from C8 to C20 linear, secondary, or tertiary alkyls.

Also described herein is the use of a hyperbranched polypropylene in a blend with an elastomer to form an impact copolymer.

Also described is the use of a melt extruder to blend a polypropylene resin and organic peroxide to form a polypropylene suitable for an impact copolymer, and additionally, either simultaneously or separately blending the elastomer with the polypropylene.

For all jurisdictions in which the doctrine of "incorporation by reference" applies, all of the test methods, patent publications, patents and reference articles are hereby incorporated by reference either in their entirety or for the relevant portion for which they are referenced.

The invention claimed is:

1. An impact copolymer comprising a polypropylene comprising at least 50 mol % propylene, and having a molecular weight distribution ($Mw_{MALLS}$/Mn) greater than 10, a branching index (g') of less than 0.97, and a melt strength greater than 40 cN determined using an extensional rheometer at 190° C., and an elastomer.

2. The impact copolymer of claim 1, wherein the polypropylene has an $Mz_{MALLS}/Mw_{MALLS}$ value of greater than 3.0.

3. The impact copolymer of claim 1, wherein the polypropylene has an $Mw_{MALLS}$/Mn within the range from 10 to 20.

4. The impact copolymer of claim 1, wherein the polypropylene has a Melt Strength within the range from 40 cN to 100 cN.

5. The impact copolymer of claim 1, wherein the impact copolymer has a Brittle-Ductile Transition temperature within a range from −60° C. to −30° C.

6. The impact copolymer of claim 1, wherein the polypropylene is the reaction product of an organic peroxide and polypropylene resin.

7. The impact copolymer of claim 1, wherein the elastomer forms oriented lamella domains in the polypropylene matrix having an average length of less than 1000 nm.

8. The impact copolymer of claim 1, comprising decomposition products consisting of carbon dioxide and alcohol.

9. Automotive components or appliance components comprising the impact copolymer of claim 1.

10. A method of making an impact copolymer of claim 1 comprising melt-blending the components, sequentially or simultaneously:

a polypropylene resin comprising at least 50 mol % propylene, and having a molecular weight distribution (Mw/Mn) greater than 6, a branching index (g') of at least 0.97, and a melt strength greater than 10 cN determined using an extensional rheometer at 190° C.; and within the range from 0.01 to 3 wt % of at least one organic peroxide, by weight of the polypropylene resin and organic peroxide; and an elastomer.

11. The method of claim 10, wherein the elastomer is melt blended with the polypropylene resin and organic peroxide.

12. The method of claim 10, wherein the polypropylene resin and organic peroxide are first melt blended, followed by combining with the elastomer.

13. The method of claim 10, wherein the polypropylene resin has an MWD (Mw/Mn) within the range from 6 to 20.

14. The method of claim 10, wherein the polypropylene resin has a Melt Strength within the range from 10 cN to 40 cN.

15. The method of claim 10, wherein the polypropylene resin has a Peak Extensional Viscosity (annealed) within a range from 10 kPa·s to 60 kPa·s at a strain rate of 0.01 $sec^{-1}$ (190° C.).

16. The method of claim 10, wherein the polypropylene resin comprises at least 90 mol % propylene.

17. The method of claim 10, wherein the polypropylene resin has an Mz/Mw value of less than 3.6.

18. The method of claim 10, wherein the organic peroxide is selected from compounds having one or more structures selected from:

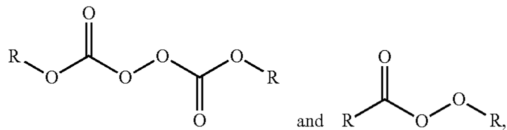

wherein each "R" group is independently selected from the group consisting of hydrogen, C1 to C24 linear alkyls, C1 to C24 secondary alkyls, C1 to C24 tertiary alkyls, C7 to C30 alkylaryls, C7 to C30 arylalkyls, and substituted versions thereof.

19. The method of claim 18, wherein each "R" group is independently selected from C8 to C20 linear, secondary, or tertiary alkyls.

* * * * *